US010771147B2

(12) United States Patent
Regunathan et al.

(10) Patent No.: US 10,771,147 B2
(45) Date of Patent: Sep. 8, 2020

(54) SATELLITE COMMUNICATION SYSTEM FOR DIVERSITY GATEWAY SWITCHING AND SATELLITE COMMUNICATION METHOD FOR DIVERSITY GATEWAY SWITCHING

(71) Applicant: Hughes Network Systems LLC, Germantown, MD (US)

(72) Inventors: Murali Regunathan, Germantown, MD (US); Satyajit Roy, Gaithersburg, MD (US); Yezdi Antia, Germantown, MD (US)

(73) Assignee: HUGHES NETWORK SYSTEMS LLC, Germantown, MD (US)

( * ) Notice: Subject to any disclaimer, the term of this patent is extended or adjusted under 35 U.S.C. 154(b) by 0 days.

(21) Appl. No.: 16/176,789

(22) Filed: Oct. 31, 2018

(65) Prior Publication Data

US 2020/0059296 A1 Feb. 20, 2020

Related U.S. Application Data

(60) Provisional application No. 62/719,305, filed on Aug. 17, 2018.

(51) Int. Cl.

*H04B 7/185* (2006.01)
*H04L 12/707* (2013.01)
*H04L 12/727* (2013.01)

(52) U.S. Cl.

CPC ..... *H04B 7/18584* (2013.01); *H04B 7/18513* (2013.01); *H04B 7/18519* (2013.01); *H04L 45/121* (2013.01); *H04L 45/22* (2013.01)

(58) Field of Classification Search

None

See application file for complete search history.

(56) References Cited

U.S. PATENT DOCUMENTS

| | | | | |
|---|---|---|---|---|
| 5,924,014 | A * | 7/1999 | Vanden Heuvel ... | H04B 7/1856 455/13.1 |
| 6,118,999 | A * | 9/2000 | Moraes ............. | H04B 7/18539 455/13.1 |
| 10,158,420 | B1 * | 12/2018 | Montsma ........... | H04B 7/18508 |
| 10,425,152 | B2 * | 9/2019 | Roy ................... | H04B 7/15592 |

(Continued)

*Primary Examiner* — Michael J Moore, Jr.

(74) *Attorney, Agent, or Firm* — Global IP Counselors, LLP

(57) ABSTRACT

A satellite communication system includes a communication terminal, and a ground station. The ground station is configured to communicate with the communication terminal through a satellite communication path between the ground station and the communication terminal via a satellite. The ground station includes a diversity switch, and an electronic controller. The diversity switch is configured to switch the satellite communication path from a first satellite communication path to a second satellite communication path different from the first satellite communication path. The electronic controller is configured to determine whether a predetermined switching condition is satisfied based on signal attenuations of the first and second satellite communication paths. The electronic controller is further configured to control the diversity switch to switch the satellite communication path upon elapsing a first predetermined time period after determining that the predetermined switching condition is satisfied.

16 Claims, 7 Drawing Sheets

Satellite 14 10 Data LC UB Downlink Beacon DB Data 24 User Beam B1 Data LC Downlink Beacon LB DB Data Data LC SB 24 User Beam B2 UB 16B LC LC Data UB LA 24 User Beam B4 24 User Beam B3 Backup RFT SECOND DOWNLINK RECEIVER CB 17B SA PB CA UB 16A Active RFT PA FIRST DOWNLINK RECEIVER 12 20 17A CONTROLLER RFT SWITCHER 18 TRANSCEIVER 23 22 MEMORY MEMORY 28 22 INTERNET 26 CONTENT PROVIDER

(56) References Cited

U.S. PATENT DOCUMENTS

2005/0207375 A1* 9/2005 Schiff ................ H04B 7/18513
370/331
2006/0217851 A1* 9/2006 McGuffin ........... H04B 7/18506
701/4
2017/0238216 A1* 8/2017 Damnjanovic ...... H04B 17/309
455/427
2017/0238228 A1* 8/2017 Zhang ................... H04W 36/30
370/331
2019/0020405 A1* 1/2019 Smith ................ H04B 7/18517
2019/0123811 A1* 4/2019 Potter .................. H04B 7/0426
2019/0165856 A1* 5/2019 Roy ................... H04B 7/18541
2019/0215701 A1* 7/2019 Honglei ................ H04L 1/1812

* cited by examiner

SATELLITE COMMUNICATION SYSTEM FOR DIVERSITY GATEWAY SWITCHING AND SATELLITE COMMUNICATION METHOD FOR DIVERSITY GATEWAY SWITCHING

CROSS-REFERENCE TO RELATED APPLICATIONS

This application claims the benefit of U.S. Provisional Application No. 62/719,305, filed on Aug. 17, 2018. The entire disclosure of U.S. Provisional Application No. 62/719,305 is hereby incorporated herein by reference.

BACKGROUND

Field of the Invention

The present invention generally relates to a satellite communication system. More specifically, the present invention relates to a satellite communication system in which a ground station is configured to communicate with a communication terminal through a satellite communication path. Also, the present invention generally relates to a satellite communication method.

Background Information

Satellite communication systems have emerged as an option for users to establish communication to terrestrial data networks, such as the Internet. Satellite communication systems typically utilize a very small aperture terminal (VSAT) at the user location. The VSAT allows users to access the terrestrial data networks. The VSAT is associated with a gateway or ground station which provides a point of connection to the terrestrial data networks for the satellite communication system.

Satellite communication systems are susceptible to the effects environmental conditions such as rain, snow, etc., ("rain fade") which can result in service disruptions. With satellite communication systems, a radio frequency (RF) site diversity is utilized to remedy the service disruptions caused by localized rain fade.

Typically, two RF sites that are deployed 50-100 kilometers apart from each other are selectively utilized to avoid the service disruptions. In particular, in such satellite communication systems, two radio frequency transmitter/receivers (RFTs) at the RF sites are connected to the same gateway, respectively. Using two RF sites increases the availability of the satellite communication system since the joint probability of simultaneous rain fade on two distant locations is lower than the probability of rain fade on each individual site. The satellite communication systems take advantage of this fact by enabling switching between the RF sites when the signal is attenuated due to rain at one RF site and not on the other RF site.

In particular, with such satellite communication systems, an RF site where the rain fade is not severely attenuating the signal can be utilized. More specifically, when there are two different RF sites connected to the same gateway, one acts as the primary and the other acts as the backup. When the rain fade becomes severe enough at the primary RF site, then the signal from the gateway is routed to the backup RF site. This allows the satellite communication system to be available more often than if only one RF site is being used.

SUMMARY

The above-mentioned RF site diversity also involves switching of a satellite communication path between the gateway and the VSATs via a satellite. However, this switching itself can also affect the availability of the satellite communication system since the satellite communication system can be unavailable during the switch of the satellite communication path.

One object is to provide a satellite communication system with which availability of the satellite communication system can be improved.

In view of the state of the known technology, a satellite communication system is provided that includes a communication terminal, and a ground station. The ground station is configured to communicate with the communication terminal through a satellite communication path between the ground station and the communication terminal via a satellite. The ground station includes a diversity switch, and an electronic controller. The diversity switch is configured to switch the satellite communication path from a first satellite communication path to a second satellite communication path different from the first satellite communication path. The electronic controller is configured to determine whether a predetermined switching condition is satisfied based on signal attenuations of the first and second satellite communication paths. The electronic controller is further configured to control the diversity switch to switch the satellite communication path upon elapsing a first predetermined time period after determining that the predetermined switching condition is satisfied.

Also, other features, aspects and advantages of the disclosed satellite communication system will become apparent to those skilled in the field of the satellite communication system from the following detailed description, which, taken in conjunction with the annexed drawings, discloses several illustrative embodiments of a satellite communication system with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
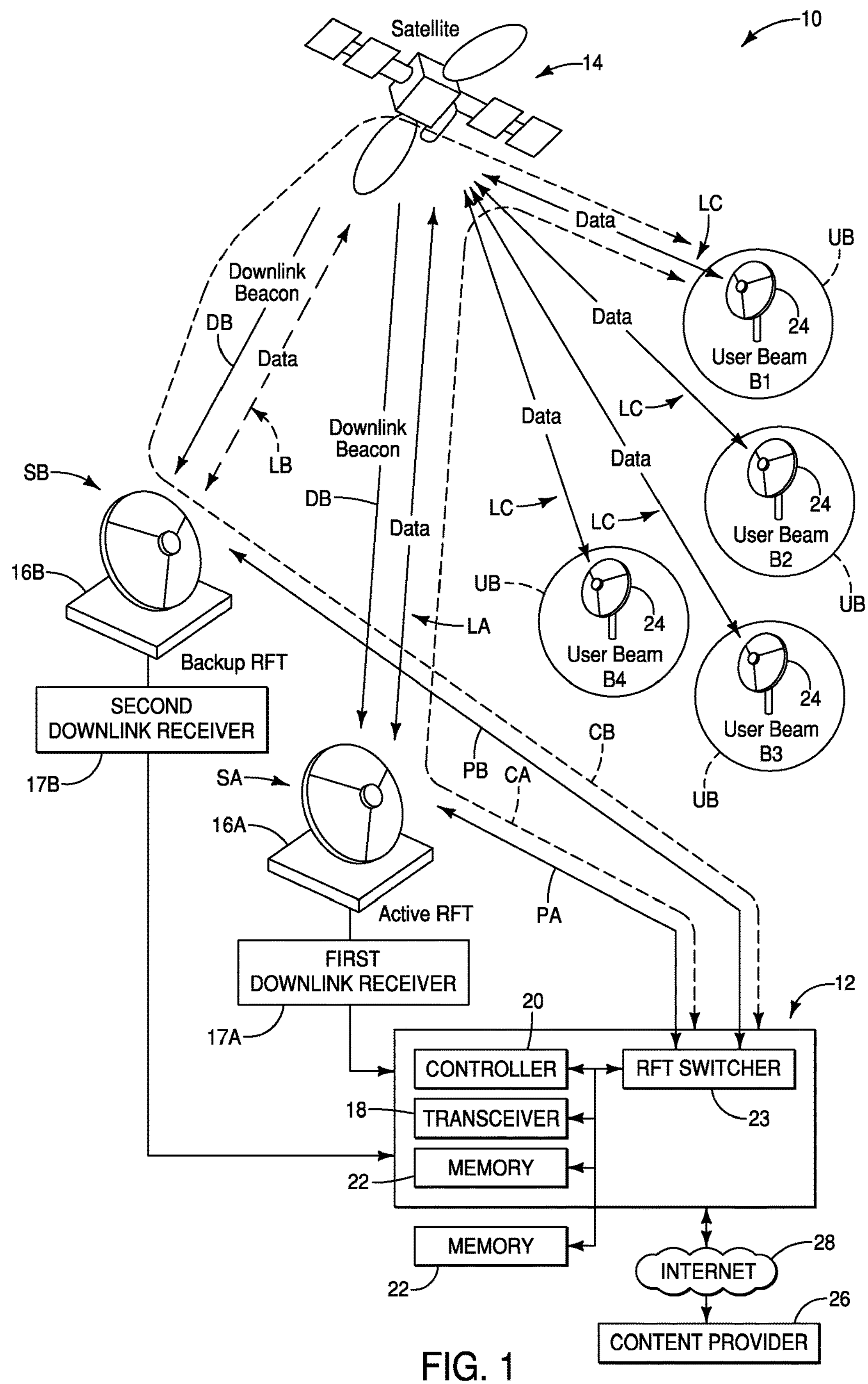
FIG. 1 illustrates an example of a satellite communication system according to one embodiment.

FIG. 1 illustrates an example of a satellite communication system 10 according to an exemplary embodiment. As shown in FIG. 1, the satellite communication system 10 includes a terrestrially mounted gateway or hub 12 (e.g., a ground station), a first or primary radio frequency terminal or transmitter/receiver (RFT) 16A (e.g., a first radio frequency transceiver), a second or backup radio frequency terminal or transmitter/receiver (RFT) 16B (e.g., a second radio frequency transceiver), a first downlink receiver 17A, a second downlink receiver 17B, and a plurality of communication terminals 24. The satellite communication system 10 forms a satellite communication network in which the gateway 12 and the communication terminals 24 communicate with each other through an orbiting satellite 14.

With this configuration, the satellite communication system 10 can utilize RF site diversity (or RF diversity switching) to combat localized rain fade and provide equipment redundancy. In particular, in the illustrated embodiment, the following components mainly performs the RF site diversity: (1) the first and second RFTs 16A and 16B; (2) the first and second downlink receivers 17A and 17B; and (3) the gateway 12 with a controller 20 and a RFT switcher 23 (described later).

Basically, the availability of the satellite communication system 10 is dependent on the amount and duration of rain fade at the location where the gateway 12 is located. The location of the gateway 12 might not meet a certain availability requirement or if it does, the capacity being served by the gateway 12 at the required availability might not meet the requirement. To be able to meet both capacity and availability requirements simultaneously, using a diverse location that can serve as a backup is desirable rather than using larger antenna sizes and potentially higher power amplifiers. Using a diverse backup location for the RFT requires a switching methodology that can take advantage of the backup location when the rain fade at the active RFT location is high. In the illustrated embodiment, a system and method is provided that can switch between the two RFTs (i.e., the first and second RFTs 16A and 16B) and help maintain the required availability and capacity during rain. In particular, in the illustrated embodiment, the satellite communication system 10 monitors the signal quality or attenuation of a downlink beacon DB from the satellite 14 at the first and second RFTs 16A and 16B and determines which of the first and second RFTs 16A and 16B to use as the active RFT. With this configuration, the magnitude of the rain fade determines which location serves as primary and which location serves as the backup. The detailed configuration of the system and the method for this RF site diversity will be described in detail later.

As shown in FIG. 1, the gateway 12 is connected to both of the first and second RFTs 16A and 16B, and transmits/receives data to/from the satellite 14. As shown in FIG. 1, the gateway 12 includes a transceiver 18, a controller 20 (e.g., an electronic controller), a memory 22, a RFT switcher 23 (e.g., a diversity switch or switching mechanism), and other types of equipment (not shown) such as amplifiers, servers and so on as understood in the art for enabling communication between the gateway 12 and the communication terminals 24 via the satellite 14. The transceiver 18 can include, for example, a modem or any other suitable equipment which enables the gateway 12 to communicate with the first and second RFTs 16A and 16B as understood in the art. The transceiver 18 can also include, for example, a modem or any other suitable equipment which enables the gateway 12 to send/receive data to/from the Internet 28 as understood in the art. With this configuration, the communication terminals 24 can send/receive data to/from the Internet 28 via the satellite 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art. The RFT switcher 23 includes an L-band switch or any other suitable type of switch as understood in the art. The RFT switcher 23 is connected to the first and second RFTs 16A and 16B, and allows the data signal to be routed to either the first RFT 16A or the second 16B.

As understood in the art, the controller 20 preferably includes a microcomputer (e.g., computer) or processor with a control program that controls the gateway 12 as discussed herein. In particular, the controller 20 executes the algorithm to decide which of the first and second RFTs 16A and 16B to use as described later. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

In the illustrated embodiment, the gateway 12 is connected to the first and second RFTs 16A and 16B. The first and second RFTs 16A and 16B each include an antenna dish that are mounted on an antenna frame and interconnected to a feed-horn to transmit the data RF signal from the gateway 12 to the satellite 14 and to receive the RF signal from the satellite 14. The feed-horn includes low noise amplifiers or high powered amplifies and down-converters or frequency converters for amplification and down conversion of the received signal, respectively. The feed-horn directs the transmitted power towards an antenna dish or collects the received power from the antenna dish. In the illustrated embodiment, the first and second RFTs 16A and 16B have duplicated equipment, such as the same configuration of amplifies and antenna sizes, to provide equipment redundancy of the satellite communication system 10 in a cost effective manner. However, the first and second RFTs 16A and 16B can include different configurations with respect to each other, as needed and/or desired.

The locations of the first and second RFTs are separated by a distance to allow the availability requirements of the satellite communication system 10 to be met and at the same time meet the capacity requirements from either location. In the illustrated embodiment, the first and second RFTs 16A and 16B are located at different RF sites SA and SB that can be deployed 50-100 kilometers apart from each other. In the illustrated embodiment, the RF site SA is collocated with the gateway 12. Specifically, the first RFT 16A is collocated with the gateway 12, and is connected to the gateway 12 through a first communication path PA. The first communication path PA includes an optical fiber cable or any other suitable type of link as understood in the art. The second RFT 16B is connected to the gateway 12 through a second communication path PB. The second communication path PB includes optical fiber cables or any other suitable type of links, such as microwave links, as understood in the art. With this configuration, the satellite communication system 10 can utilize RF site diversity to combat localized rain fade and provide equipment redundancy. Specifically, in the illustrated embodiment, as illustrated in FIG. 1, the RFT switcher 23 of the gateway 12 selects one of the first and second communication paths PA and PB to select an active RFT from the first and second RFTs 16A and 16B, and thereby switch a satellite communication path between the gateway 12 and the communication terminals 24. In the illustrated embodiment, the phrase "RF site diversity" refers to switching between the first and second communication paths PA and PB, which involves switching of an active RFT between the first and second RFTs 16A and 16B.

The first and second downlink receivers 17A and 17B are located at the RF site SA and SB, respectively. For example, the first and second RFTs 16A and 16B can include the first and second downlink receivers 17A and 17B, respectively. The first and second RFTs 16A and 16B measure the signal-to-noise ratio (SNR) of the downlink beacon DB broadcasted by the satellite 14. The downlink beacon DB is normally emitted on a fixed frequency to locate the satellite 14 or for other purposes as understood in the art. In the illustrated embodiment, the change in SNR is utilized to indicate the amount of rain fade occurring at the RF site SA and SB.

The gateway 12, the satellite 14 and the communication terminals 24 typically communicate with each other over a radio frequency link, such as a Ku-band link, a Ka-band link or any other suitable type of link as understood in the art, which can generally be referred to as a space link. Specifically, in the illustrated embodiment, the first RFT 16A can establish a first space link LA between the satellite 14 and the first RFT 16A, while the second RFT 16B can establish a second space link LB between the satellite 14 and the second RFT 16B. Also, in the illustrated embodiment, the communication terminals 24 can each establish a third space link LC between the satellite 14 and the communication terminals 24. With this configuration, when the RFT switcher 23 selects the first communication path PA, a first satellite communication path CA is established between the gateway 12 and the communication terminals 24 through the satellite 14. Specifically, the first satellite communication path CA includes the first communication path PA, the first space link LA and the third space link LC. On the other hand, when the RFT switcher 23 selects the second communication path PB, a second satellite communication path CB is established between the gateway 12 and the communication terminals 24 through the satellite 14. Specifically, the second satellite communication path CB includes the second communication path PB, the second space link LB and the third space link LC. In the illustrated embodiment, as shown in FIG. 1, the gateway 12 can be configured as a network management center or network operating center which, among other things, operates to communicate with remote sites, such as web content providers 26, via the Internet 28, cloud storage, or other terrestrial data networks as understood in the art. With this configuration, the satellite communication system 10 can provide access to the Internet 28 to the users of the communication terminals 24.

The satellite 14 can be any suitable communications satellite for connecting the gateway 12 to the communication terminals 24. The satellite 14 can use small spot beams to optimize capacity and availability for user terminal and gateway access, with uplink and downlink frequencies reused between spot beams in a pattern to maximize capacity and coverage while minimizing cofrequency interference. The satellite 14 provides a gateway coverage by a gateway spot beam. In the illustrated embodiment, the first and second RFTs 16A and 16B are located within the range of the same gateway spot beam. Also, the satellite 14 provides a user terminal coverage by a plurality of user spot beams UB. In the illustrated embodiment, the communication terminals 24 are grouped into a plurality of terminal populations that are covered by the user spot beams UB, respectively.

Figure 2:
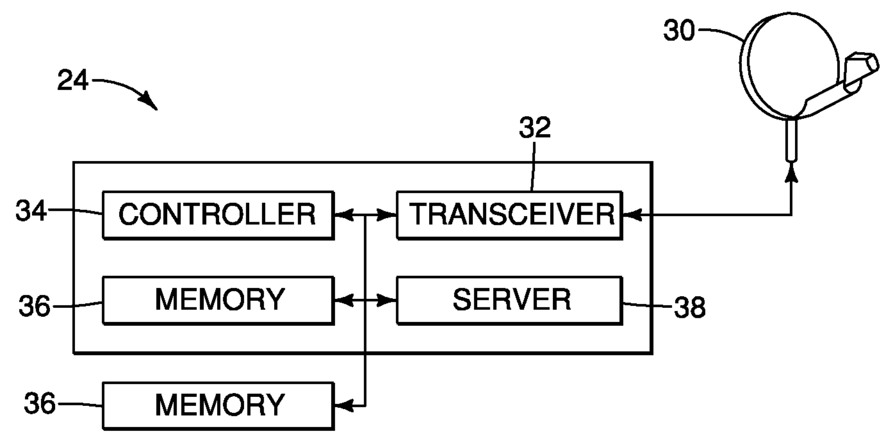
FIG. 2 illustrates further details of a communication terminal of the satellite communication system shown in FIG. 1.

In the illustrated embodiment, the communication terminals 24 are each configured as a VSAT. Referring now to FIG. 2, the communication terminals 24 each typically include an antenna dish 30, a transceiver 32, a controller 34, a memory 36, a local server 38 and other types of equipment (not shown) such as amplifiers, waveguides and so on as understood in the art on which enable communication between the communication terminal 24 and the gateway 12 via the satellite 14. The transceiver 32 can include, for example, an integrated satellite modem and any other suitable equipment which enables the transceiver 32 to communicate with the satellite 14 as understood in the art. The memory 36 can be, for example, an internal memory in the communication terminal 24, or other type of memory devices such as a flash memory or hard drives with external high speed interface such as a USB bus or an SATA bus, or remote memories such as cloud storage and so on. These other types of memory can be present at the communication terminal 24 or accessible at a location apart from the communication terminal 24 via a network connection such as an Ethernet connection, a WiFi connection or any other suitable type of connection as understood in the art. Also, the local server 38 can communicate with an access point, such as a WAP or any other suitable device, which enables the local server 38 to provide packets to end user devices. Such end user devices include, for example, desktop computers, laptop or notebook computers, tablets, smart phones, Smart TVs and any other suitable devices as understood in the art. Naturally, the communications between the local server 38, the access point and the end user devices can occur over wireless connections, such as WiFi connections, as well as wired connections as understood in the art.

As with the controller 20 of the gateway 12, the controller 34 preferably includes a microcomputer with a control program that controls the communication terminal 24 as discussed herein. The controller 34 can also include other conventional components such as an input interface circuit, an output interface circuit, and storage devices such as a ROM (Read Only Memory) device and a RAM (Random Access Memory) device. The RAM and ROM store processing results and control programs that are run by the controller 34. The controller 34 is operatively coupled to the components of the communication terminal 24 as appropriate, in a conventional manner. It will be apparent to those skilled in the art from this disclosure that the precise structure and algorithms for the controller 34 can be any combination of hardware and software that will carry out the functions of the present invention.

Figure 3:
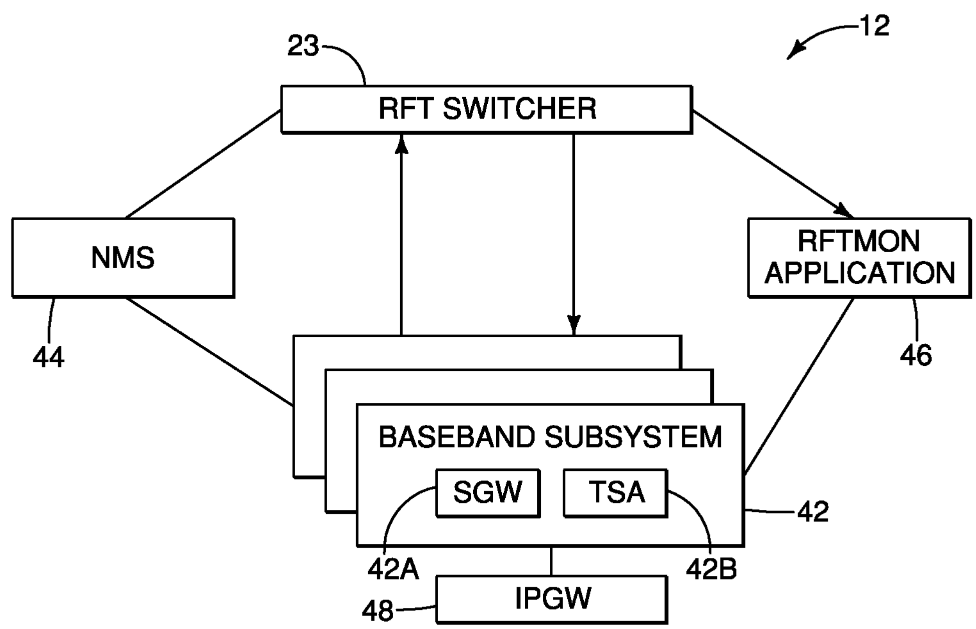
FIG. 3 illustrates further details of a satellite gateway of the satellite communication system shown in FIG. 1.

FIG. 3 illustrates further details pertaining to the gateway 12 for communicating in the satellite communication system 10. These components of the gateway 12 as shown in FIG.

3 can be carried out by the controller 20 or controllers 20 and their related hardware and software associated with the gateway 12 as can be appreciated by one skilled in the art. In the illustrated embodiment, the gateway 12 further includes a plurality of baseband subsystems 42, a network management system (NMS) 44, an RFTMon application 46 and an internet protocol gateway (IPGW) 48.

The baseband subsystems 42 each include a satellite gateway (SGW) 42A and a timing synchronization application (TSA) 42B. The SGW 42A estimates transport bandwidth based on, for example, modulation and coding and symbol rate of the packets being transmitted by the gateway 12 and of the packets being received by the gateway 12. The TSA 42B periodically broadcasts via the Superframe Numbering Packets (SFNP) timing reference and synchronization to the communication terminals 24. The baseband subsystems 42 also host a modulator, a demodulator and a network layer equipment as understood in the art. The NMS 44 manages and maintains the operational status of various components of the gateway 12. The IGPW 48 determines traffic demands for each of the communication terminals 24 and requests bandwidth from the SGW 42A, and the SGW 42A performs bandwidth allocations to the IPGW 48. Basically, with this configuration, the gateway 12 allows the communication terminals 24 to access the web content provider 26 via the Internet 28. The RFTMon application 46 monitors the switching operation of the RFT switcher 23. The detailed operations of the TSA 42B and the RFTMon application 46 in regards to the RF site diversity will be described later in detail.

Referring now to FIGS. 4A to 9, the RF site diversity of the satellite communication system 10 (e.g., satellite communication method) will be described.

As mentioned above, in the illustrated embodiment, the satellite communication system 10 executes the RF site diversity by selecting a new satellite communication path from among the first and second satellite communication paths CA and CB. In other words, in the illustrated embodiment, the satellite communication system 10 executes the RF site diversity by switching the satellite communication path from an "active or old satellite communication path" to a "backup, new or target satellite communication path."

In the illustrated embodiment, the RF site diversity switching between the first and second RFTs 16A and 16B involves constantly monitoring the SNR of the downlink beacon DB by the first and second downlink receivers 17A and 17B at the first and second RF sites SA and SB, respectively. The amount of downlink rain fade is calculated from the change in SNR from clear sky conditions. Moving averages of the downlink fade on both of the first and second RF sites SA and SB are calculated, respectively, to reduce the noise and fluctuations in the SNR of the downlink beacon DB. At a certain amount of rain fade, the capacity of the satellite communication system 10 that is supported by the gateway 12 through the primary RFT (e.g., the first RFT 16A) reduces to less than what is required. At this instant, the primary RFT is switched out and the backup RFT (e.g., the second RFT 16B) is switched in. In the illustrated embodiment, the RF site diversity uses a switch and stay philosophy which means that the backup RFT becomes the primary RFT and the primary RFT acts as the backup RFT after the switching of the RF site diversity. If the rain fade at the backup RFT is also higher than a predetermined threshold, then the switching of the RF site diversity does not occur.

Although the total system availability is improved by switching between the two RFTs 16A and 16B, each switching operation can also reduce the availability since the satellite communication system 10 is unavailable during the switching of the RF site diversity. The duration it takes for the switching of the RF site diversity to occur, the joint availability of the satellite communication system 10 and the system availability requirement dictate the number of switches that can be supported in a time period. The joint availability of the satellite communication system 10 indicates the total system availability in which either the first RFT 16A or the second RFT 16B is available. The joint availability should be greater than the system availability requirement to allow for the unavailability due to the switching of the RF site diversity.

Ideally, the number of the switches (or switching events) of the RF site diversity that can be supported by the satellite communication system 10 should exceed the number of rain events in which the fade depth or attenuation is higher than a predetermined threshold. The number and duration of rain events in which a certain fade depth is exceeded can be estimated by the ITU recommended models. For example, the number of rain events in which a certain fade depth or attenuation is exceeded falls exponentially with respect to the duration of the rain event. Thus, if the number of rain events exceeds the number of the switches of the RF site diversity that can be supported by the satellite communication system 10, then (I) the number of the switches of the RF site diversity and/or (II) the switching time or duration for the switching of the RF site diversity need to be minimized to satisfy the system availability requirement.

Figure 4A:
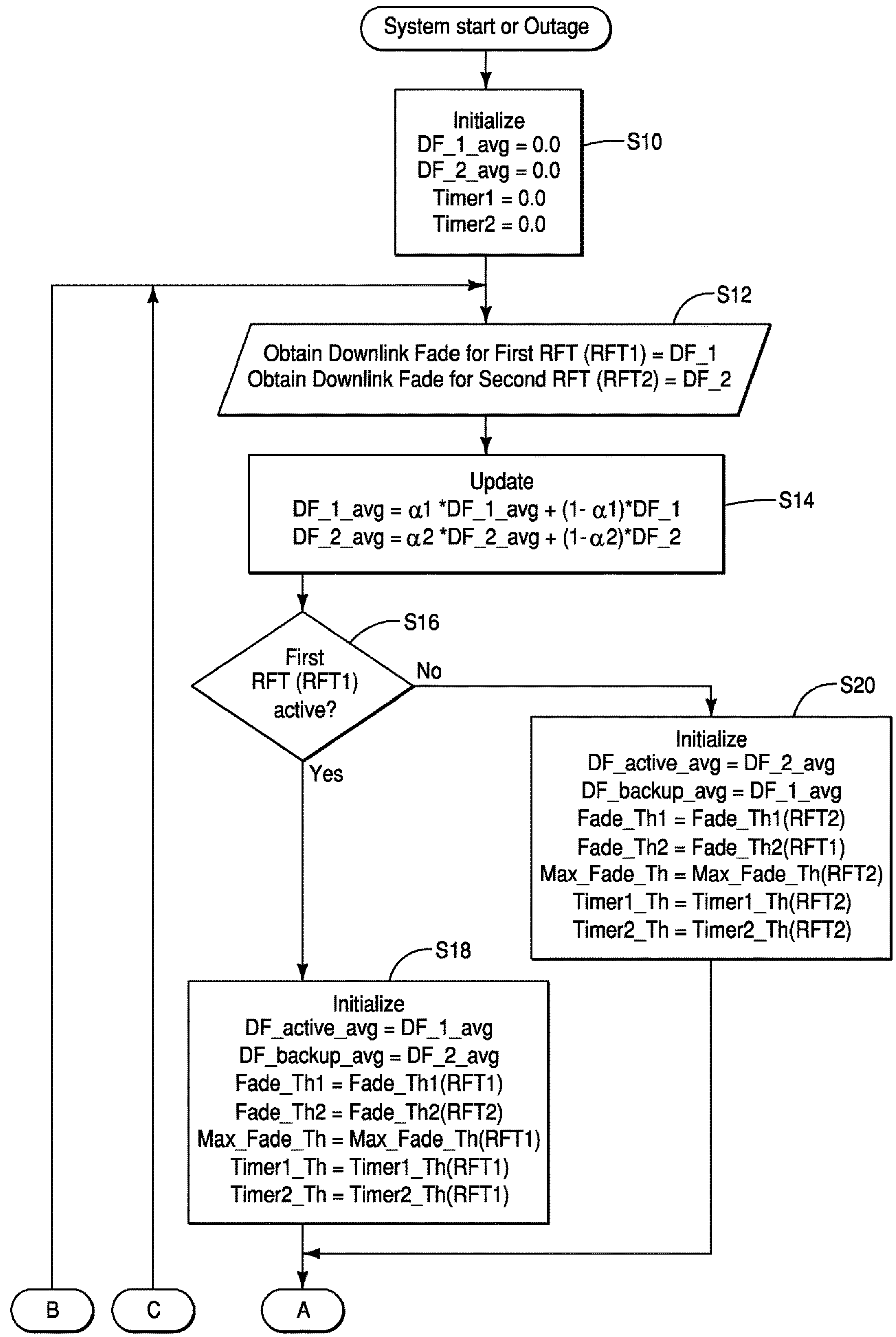
FIG. 4A is a flowchart showing a switching determination process of a satellite communication path at the satellite gateway.
Figure 4B:
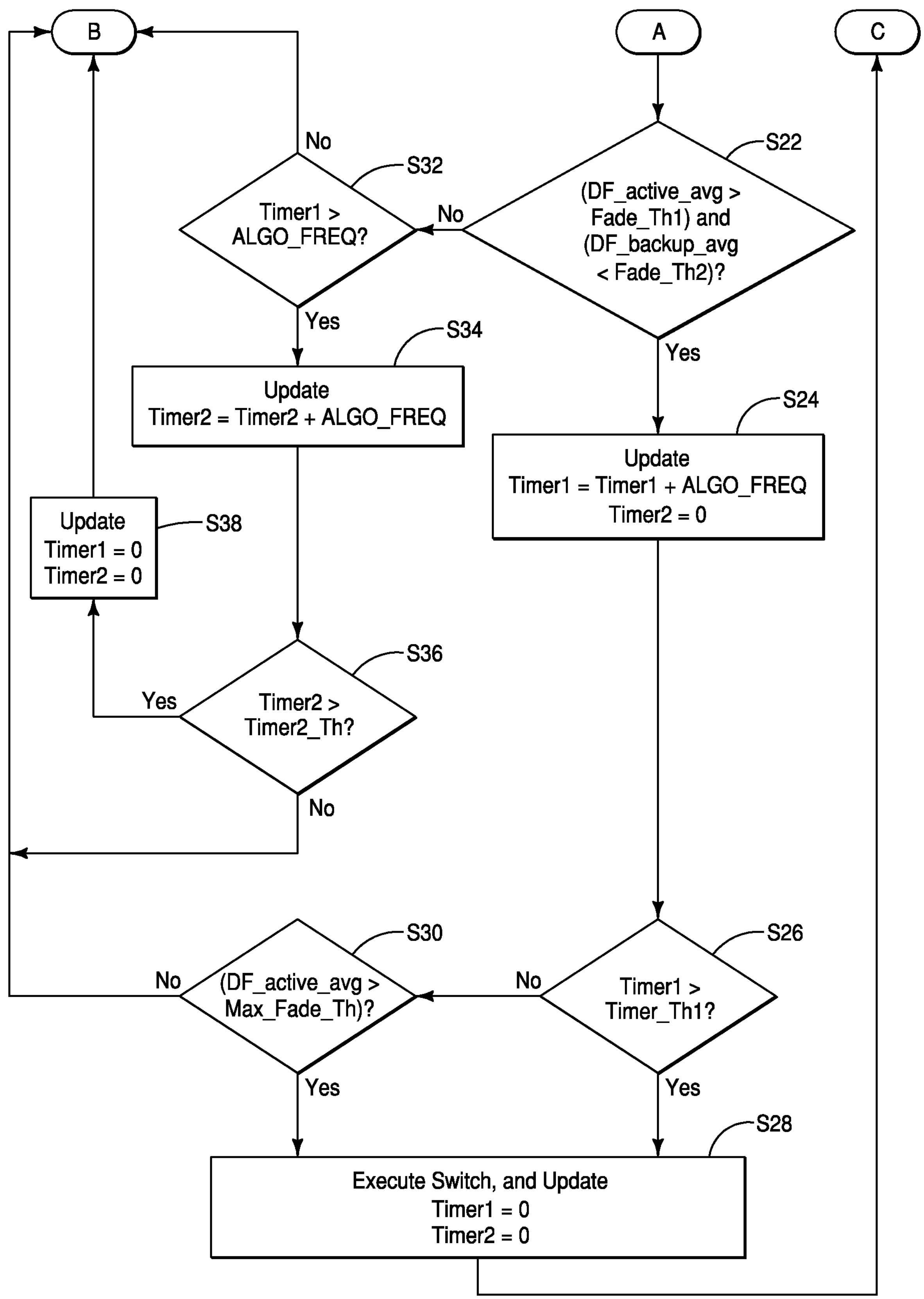
FIG. 4B is a flowchart showing the switching determination process of the satellite communication paths at the satellite gateway.

Referring now to FIGS. 4A and 4B, a switching determination process of the satellite communication system 10 (e.g., satellite communication method) during the RF site diversity will be described. With this switching determination process, (I) the number of the switches of the RF site diversity can be minimized. In particular, in the illustrated embodiment, the number of the switches of the RF site diversity can be reduced by reacting to rain events that are of a longer duration.

Specifically, in the switching determination process, the algorithm processed by the controller 20 of the gateway 12 waits for a predetermined period of time (Timer1_Th) after the fade depth at the active RFT reaches a predetermined downlink fade threshold (Fade_Th1) to ensure that the rain event is of a sufficient duration. This predetermined period of time (Timer1_Th) can be configurable based on the configuration of the satellite communication system 10, the locations of the first and second RFTs 16A and 16B, the system availability requirements, etc. During this predetermined period of time (Timer1_Th), the satellite communication system 10 operates on a capacity slightly lower than the desired capacity for trading the capacity requirement to meet the system availability requirement. To guarantee that the capacity does not decrease drastically during this predetermined period of time (Timer1_Th), a minimum attenuation or maximum fade threshold (Max_Fade_Th) is used. If this maximum fade threshold (Max_Fade_Th) is reached during this predetermined period of time (Timer1_Th), then the satellite communication system 10 executes the switching of the RF site diversity to the backup RFT without any further wait. Also, to allow for any small fluctuations in the downlink fade that drops it below this predetermined fade threshold (Fade_Th1), another predetermined period of time (Timer2_Th) is used. If the downlink fade drops below the predetermined fade threshold (Fade_Th1) for a time that is less than this predetermined period of time (Timer2_Th), then the measurement of the wait time for the predetermined period of time (Timer1_Th) is not reset.

This algorithm provides multiple configurable parameters as illustrated in Table 1 that can be tuned to provide the necessary performance for the satellite communication system 10. The algorithm runs at a constant interval (ALGO_FREQ) that is also configurable. In the illustrated embodiment, this constant interval (ALGO_FREQ) is set to 0.5 seconds, for example. This constant interval need not match the interval at which the SNR of the downlink beacon DB is measured. The measurement results of the downlink beacon DB update a shared memory, such as the memory 22, from which the algorithm can read the measurement results. In the illustrated embodiment, as illustrated in Table 1, two different sets of parameters for the first and second RFTs 16A and 16B are independently settable, respectively. Specifically, parameter values for these parameters in Table 1 are preset in the memory 22 of the gateway 12.

TABLE 1

Parameters for Swiching Determination Process

| Parameter for First RFT 16A (RFT1) | Description | Paramater for Second RFT 16B (RFT2) | Description |
|---|---|---|---|
| α1 | Filter coefficient | α2 | Filter coefficient |
| Fade_Th1(RFT1) | Downlink Fade threshold for active RFT | Fade_Th1(RFT2) | Downlink Fade threshold for active RFT |
| Fade_Th2(RFT1) | Downlink Fade threshold for backup RFT | Fade_Th2(RFT2) | Downlink Fade threshold for backup RFT |
| Max_Fade_Th(RFT1) | Maximum Fade threshold for active RFT | Max_Fade_Th(RFT2) | Maximum Fade threshold for active RFT |
| Timer1_Th(RFT1) | Timer threshold for wait time elapsed after Downlink Fade threshold is exceeded | Timer1_Th(RFT2) | Time threshold for wait time elapsed after Downlink Fade threshold is exceeded |
| Timer2_Th(RFT1) | Time threshold for time elapsed after Downlink Fade falls below Downlink Fade threshold (having exceeded it before) | Timer2_Th(RFT2) | Time threshold for time elapsed after Downlink Fade falls below Downlink Fade threshold (having exceeded it before) |

As mentioned above, parameter values of these parameters can be independently settable, as needed and/or desired. However, parameter values of these parameters for the first and second RFT 16A and 16B can also be set to equal to each other. For example, parameters "α1" and "α2" can be equal to each other. Similarly, parameters "Fade_Th1 (RFT1)" and "Fade_Th1(RFT2)," "Fade_Th2(RFT1)" and "Fade_Th2(RFT2)," "Max_Fade_Th(RFT1)" and "Max_Fade_Th(RFT2)," "Timer1_Th(RFT1)" and "Timer1_Th(RFT2)," and "Timer2_Th(RFT1)" and "Timer2_Th(RFT2)" can be equal to each other, respectively.

Referring further to FIGS. 4A and 4B, the switching determination process of the satellite communication system 10 will be described in detail. This switching determination process is executed by the controller 20 of the gateway 12.

As illustrated in FIG. 4A, the controller 20 first initializes parameters "DF_1_avg," "DF_2_avg," "Timer1," and "Timer2," and sets these parameters to an initial value, such as zero (0.0), in response to the system start or after the outage (step S10). The parameters "DF_1_avg" and "DF_2_avg" represent average downlink fades for the first and second RFTs 16A and 16B, respectively. The parameter "Timer1" represents a wait time after the predetermined downlink threshold "Fade_Th1" for the active RFT is reached. The parameter "Timer2" represents a time elapsed after the downlink fade falls below the predetermined downlink threshold "Fade_Th1" for the active RFT after the downlink fade exceeded the predetermined downlink threshold "Fade_Th1" for the active RFT.

The controller 20 then obtains the inputs of the downlink fades "DF_1" and "DF_2" for the first and second RFTs 16A and 16B from the first and second downlink receiver 17A and 17B, respectively (step S12). Then, the controller 20 updates the average downlink fades "DF_1_avg" and "DF_2_avg" by calculating moving averages of the downlink fades "DF_1" and "DF_2" using the filter coefficients "α1" and "α2" for averaging filter, respectively (step S14). The moving averages of the downlink fades "DF_1" and "DF_2" can be calculated as any types of moving averages as understood in the art, such as the simple moving average, the weighted moving average, the exponential moving average, the block moving average, etc. In the illustrated embodiment, the moving averages of the downlink fades "DF_1" and "DF_2" are updated as follows: DF_1_avg=α1 *DF_1_avg+(1−α1)*DF_1; and DF_2_avg=α2*DF_2_avg+(1−α1)*DF_2.

The controller 20 then determines whether the first RFT 16A is currently operating as an active RFT (steps S16). If the controller 20 determines that the first RFT 16A is an active RFT (Yes in step S16), then the controller 20 initializes parameters "DF_active_avg," "DF_backup_avg," "Fade_Th1," "Fade_Th2," "Max_Fade_Th," "Timer1_Th," and "Timer2_Th" (step S18) Specifically, the controller 20 sets these parameters based on calculation in step S14 and Table 1 as follows: DF_active_avg=DF_1_avg; DF_backup_avg=DF_2_avg; Fade_Th1=Fade_Th1(RFT1); Fade_Th2=Fade_Th2(RFT2); Max_Fade_Th=Max_Fade_Th(RFT1); Timer1_Th=Timer1_Th(RFT1); and Timer2_Th=Timer2_Th(RFT1).

Similarly, if the controller 20 determines that the second RFT 16B is an active RFT (No in step S16), then the controller 20 initializes parameters "DF_active_avg," "DF_backup_avg," "Fade_Th1," "Fade_Th2," "Max_Fade_Th," "Timer1_Th," and "Timer2_Th" (step S20) Specifically, the controller 20 sets these parameters based on calculation in step S14 and Table 1 as follows: DF_active_avg=DF_2_avg; DF_backup_avg=DF_1_avg; Fade_Th1=Fade_Th1(RFT2); Fade_Th2=Fade_Th2 (RFT1); Max_Fade_Th=Max_Fade_Th(RFT2);

Timer1_Th=Timer1_Th(RFT2); and Timer2_Th=Timer2_Th(RFT2).

Furthermore, as illustrated in FIG. 4, the controller 20 determines whether a predetermined switching condition is satisfied (step S22). Specifically, the controller 20 determines whether the average downlink fades for the active RFT "DF_active_avg" is larger than the predetermined fade threshold for the active RFT "Fade_Th1" (DF_active_avg>Fade_Th1) and whether the average downlink fades for the backup RFT "DF_backup_avg" is smaller than the predetermined fade threshold for the backup RFT "Fade_Th2" (DF_backup_avg<Fade_Th2). The controller 20 determines that the predetermined switching condition is satisfied when the controller 20 determines DF_active_avg>Fade_Th1 and DF_backup_avg<Fade_Th2.

If the controller 20 determines DF_active_avg>Fade_Th1 and DF_backup_avg<Fade_Th2 (Yes in step S22), then the controller 20 updates the parameters "Timer1" and "Timer2" as follows: Timer1=Timer1+ALGO_FREQ; and Timer2=0 (step S24) to start the count of the wait time "Timer1." Furthermore, the controller 20 determines whether the wait time "Timer1" exceeds the time threshold "Timer1_Th" (Timer1>Timer1_Th) (step S26).

If the controller 20 determines Timer1>Timer1_Th (Yes in step S26), then the controller 20 controls the RFT switcher 23 to physically execute the switching of the RF site diversity between the first and second RFTs 16A and 16B (step S28). Then, the controller 20 resets the parameters "Timer1" and "Timer2" to zero, and the process returns to step S12 in FIG. 4A.

On the other hand, if the controller 20 does not determine Timer1>Timer1_Th (No in step S26), then the controller 20 further determines whether the average downlink fades for the active RFT "DF_active_avg" is larger than the maximum fade threshold for the active RFT "Max_Fade_Th" (DF_active_avg>Max_Fade_Th) (step S30).

If the controller 20 determines DF_active_avg>Max_Fade_Th (Yes in step S30), then the controller 20 controls the RFT switcher 23 to physically execute the switching of the RF site diversity between the first and second RFTs 16A and 16B (step S28). If the controller 20 does not determine DF_active_avg>Max_Fade_Th (No in step S30), then the process returns to step S12 in FIG. 4A.

Furthermore, if the controller 20 does not determine DF_active_avg>Fade_Th1 and DF_backup_avg<Fade_Th2 (No in step S22), then the controller 20 further determines whether the wait time "Timer1" exceeds the parameter "ALGO_FREQ" to determine whether the predetermined switching condition has ever been satisfied and the count of the wait time "Timer1" has been started (Yes in step S22 and step S24). If the predetermined switching condition has ever been satisfied and the controller 20 determines Timer1>ALGO_FREQ (Yes in step S32), then the controller 20 updates the parameter "Timer2" as follows: Timer2=Timer2+ALGO_FREQ (step S34) to start the count of the time "Timer2." Furthermore, the controller 20 determines whether the time "Timer2" exceeds the time threshold "Timer2_Th" (Timer2>Timer2_Th) (step S36).

If the controller 20 determines Timer2>Timer2_Th (Yes in step S36), then the controller 20 updates and resets the parameters "Timer1" and "Timer2" to zero, and the process returns to step S12 in FIG. 4A. On the other hand, if the controller 20 does not determine Timer2>Timer2_Th (No in step S36), then the process returns to step S12 in FIG. 4A without resetting the count of time "Timer1" and "Timer2."

In the illustrated embodiment, the controller 20 determines whether the predetermined switching condition is satisfied based on the downlink fades of the downlink beacon DB along the first and second satellite communication paths CA and CB (e.g., the signal attenuations of the first and second satellite communication paths) (step S22). The controller 20 controls the RFT switcher 23 (e.g., the diversity switch) to switch the satellite communication path (step S28) upon elapsing the predetermined period of time "Timer1_Th" (e.g., the first predetermined time period) after determining that the predetermined switching condition is satisfied (Yes in step S22).

In the illustrated embodiment, the controller 20 does not control the RFT switcher 23 to switch the satellite communication path when the controller 20 determines that the predetermined switching condition is not satisfied (No in step S22) for more than the predetermined period of time "Timer2_Th" (e.g., the second predetermined time period) (Yes in step S36) before elapsing the predetermined period of time "Timer1_Th."

In the illustrated embodiment, the controller 20 controls the RFT switcher 23 to switch the satellite communication path (step S28) upon elapsing the predetermined period of time "Timer1_Th" (e.g., the first predetermined time period) after firstly determining that the predetermined switching condition is satisfied (Yes in step S22 in the previous loop) when the controller 20 subsequently determines that the predetermined switching condition is satisfied within the predetermined period of time "Timer2_Th" (e.g., the second predetermined time period) (Yes in step S22 in the subsequent loop before determining Yes in step S36) after determining that the predetermined switching condition is not satisfied (No in step S22).

In the illustrated embodiment, the satellite communication system 10 includes the first RFT 16A (e.g., the first radio frequency transceiver) and the second RFT 16B (e.g., the second radio frequency transceiver). The first RFT 16A is located between the gateway 12 and the satellite 14 on the first satellite communication path CA. The second RFT 16B is located between the gateway 12 and the satellite 14 on the second satellite communication path CB. The second RFT 16B is located away from the first RFT 16A.

In the illustrated embodiment, the controller 20 obtains the downlink fades (e.g., the signal attenuations or signal fades) of the downlink beacon DB broadcasted by the satellite 14 on the first and second satellite communication paths CA and CB.

In the illustrated embodiment, the controller 20 determines that the predetermined switching condition is satisfied (Yes in Step S22) upon determining that the downlink fade "DF_active_avg" (e.g., the signal fade) of the downlink beacon DB on the first satellite communication path CA is larger than the predetermined fade threshold "Fade_Th1" (e.g., the first fade threshold) and that the downlink fade "DF_backup_avg" (e.g., the signal fade) of the downlink beacon DB on the second satellite communication path CB is smaller than the predetermined fade threshold "Fade_Th2" (e.g., the second fade threshold).

In the illustrated embodiment, the satellite communication method includes switching, by the RFT switcher 23 (e.g., the diversity switch), the satellite communication path between the gateway 12 (e.g., the ground station) and the communication terminals 24 via the satellite 14 from the first satellite communication path CA to the second satellite communication path CB different from the first satellite communication path CA, determining whether the predetermined switching condition is satisfied based on the downlink fades of the downlink beacon DB along the first and second satellite communication paths CA and CB (e.g., the signal attenuations of the first and second satellite communication paths) (step S22), and controlling the RFT switcher 23 to switch the satellite communication path upon elapsing the predetermined period of time "Timer1_Th" (e.g., the first predetermined time period) after determining that the predetermined switching condition is satisfied (Yes in step S22).

Referring now to FIGS. 5 to 9, a transmission process of Superframe Numbering Packet (SFNP) messages by the gateway 12 (see FIG. 6), a parameter setting process by the gateway 12 (see FIG. 7) and a connection process of the communication terminal 24 (see FIG. 5) (e.g., satellite communication method) during the RF site diversity will be described. With this transmission process, the parameter setting process and the connection process, (II) the switching time or duration for the switching of the RF site diversity can be minimized.

In particular, in the illustrated embodiment, to minimize the switching time, many measures are taken as follows:

(1) Optimizing Frequency Locked Loop (FLL) locking time at the communication terminals 24;

(2) Signaling the switching of the RF site diversity to the communication terminals 24;

(3) Broadcasting new propagation delay ($T_{HSH}$) to the communication terminals 24;

(4) Increasing the number of ALOHA channels dynamically right after the switching of the RF site diversity; and (5) Increasing bandwidth allocation hold time during a switching process.

These measures (1)-(5) will be described in detail.

In the illustrated embodiment, the crystal oscillator drift of the communication terminals 24 is minimized by employing a Frequency Locked Loop (FLL) procedure. The communication terminals 24 each include a crystal oscillator (not shown). The oscillator of the communication terminals 24 is locked through FLL to the received outroute signal, which in turn is locked to a very stable 10 MHz clock of the gateway 12. A flywheel mechanism is in place which allows the FLL procedure not to start from scratch when the outroute signal is unlocked for a period of time that is less than a time threshold. This time threshold is configurable and is typically set to a value that is greater than the switching time of the RF site diversity in the satellite communication system 10.

Furthermore, in the illustrated embodiment, the satellite communication system 10 uses TDMA (Time Division Multiplexing Access) technology for the return channel or inroute transmission. As the GEO stationary satellite moves daily within its satellite keeping box, maintenance of the precise timing of the inroute transmission is very important such that the inroute bursts from the communication terminals 24 fall inside a very small aperture (around 30-40 microseconds) at the gateway 12. More specifically, for the timing synchronization, the communication terminals 24 conduct closed loop timing adjustment in which the communication terminals 24 send the inroute bursts to get timing correction feedback from the gateway 12, and adjust propagation timing for the inroute transmission using the feedback correction. This closed loop timing adjustment along with an estimated propagation delay ($T_{HSH}$) (or an estimated gateway to satellite RTT (round trip time) propagation delay) is used for this timing synchronization. This estimated propagation delay ($T_{HSH}$) is calculated by the controller 20 of the gateway 12 based on the timing correction at the communication terminals 24. This timing correction at the communication terminals 24 is done using the closed loop timing feedback. Specifically, Superframe Numbering Packets (SFNP) are used by the gateway 12 to convey the estimated propagation delay ($T_{HSH}$). Also, another message called Closed Loop Timing Feedback Packets are used by the gateway 12 to convey the timing offset or error of each of the communication terminals 24. This SFNP message is sent from the gateway 12 periodically at a constant interval. In the illustrated embodiment, this interval is set to 360 milliseconds, for example.

Due to geographic location differences between the first and second RFTs 16A and 16B, the propagation delay ($T_{HSH}$) will be different when the satellite communication path is switched between the first and second satellite communication paths CA and CB. During the switching process, the gateway 12 conveys through the SFNP message to the communication terminals 24 the propagation delay corresponding to the switched-in RFT to be used by the communication terminals 24. It is important to ensure that the gateway 12 does not advertise the propagation delay which does not correspond to the current physical path. With the satellite communication system 10, this situation is prevented from happening. Specifically, when the controller 20 of the gateway 12 that executes the switching process of the RF site diversity detects the switch to occur, the controller 20 instructs the TSA 42B (FIG. 3) at the gateway 12 to broadcast to all of the communication terminals 24 via the SFNP message that the switching process is in transition. In the illustrated embodiment, the SFNP message includes a switching transition bit (e.g., a transition indicator), and the controller 20 sets the switching transition bit to indicate whether the switching process is in transition (e.g., whether the switching process is occurring).

Figure 5:
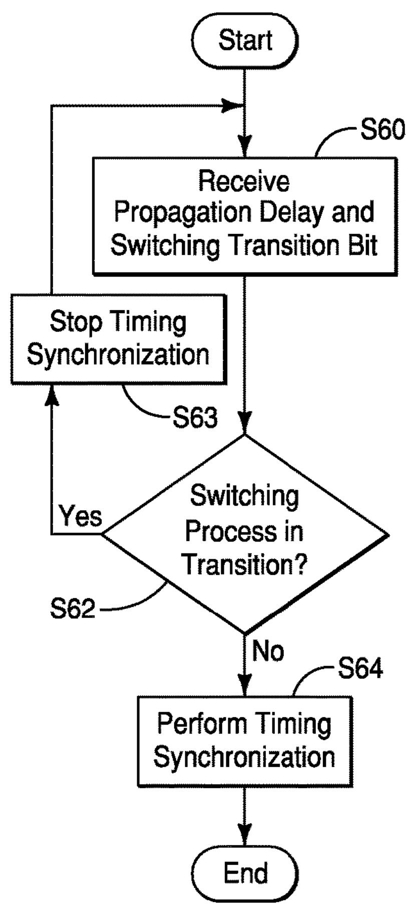
FIG. 5 is a flowchart showing a connection process of the communication terminal.

FIG. 5 illustrates the connection process of the communication terminals 24. Referring to FIG. 5, after receiving the propagation delay and the switching transition bit (step S60), the communication terminals 24 determines whether the switching process is in transition (e.g., whether the switching process is occurring) based on the switching transition bit (Step S62). If the communication terminals 24 sees the switching transition bit set to ON in the SFNP message, then the communication terminals 24 determine that the switching process is occurring (Yes in step S62). In this case, the communication terminals 24 stop or freeze the timing synchronization or adjustment (step S63), and the process returns to step S60. When the switching algorithm (e.g., RFTMon application 46) executed by the controller 20 at the gateway 12 is confirmed of the fact that the switching is either successful or has failed, then the controller 20 running the switching algorithm instructs the TSA 42B to reset the switching transition bit to OFF in the SFNP message. Also, the controller 20 instructs the TSA 42B to set the propagation delay corresponding to the new switched-in RFT if the switching is successful, or to keep the same propagation delay if the switching is failed.

On the other hand, if the communication terminals 24 see the RFT transition bit OFF and the new propagation delay in the SFNP message, then the communication terminals 24 determine that the switching process is not occurring (No in step S62). In this case, the communication terminals 24 start performing the timing synchronization (step S64) to adjust the TDMA transmission timing accordingly such that the inroute bursts transmitted from the communication terminals 24 fall inside the aperture at the gateway 12 when the new RFT is switched-in. Thus, in the illustrated embodiment, the communication terminals 24 adjust the TDMA transmission timing (e.g., the propagation parameter) for communication with the gateway 12 based on the propagation delay (e.g., the network parameter) transmitted from the gateway 12. Furthermore, in step S64, the communication terminals 24 execute the FLL procedure to be locked to the clock of the gateway 12.

Figure 8:
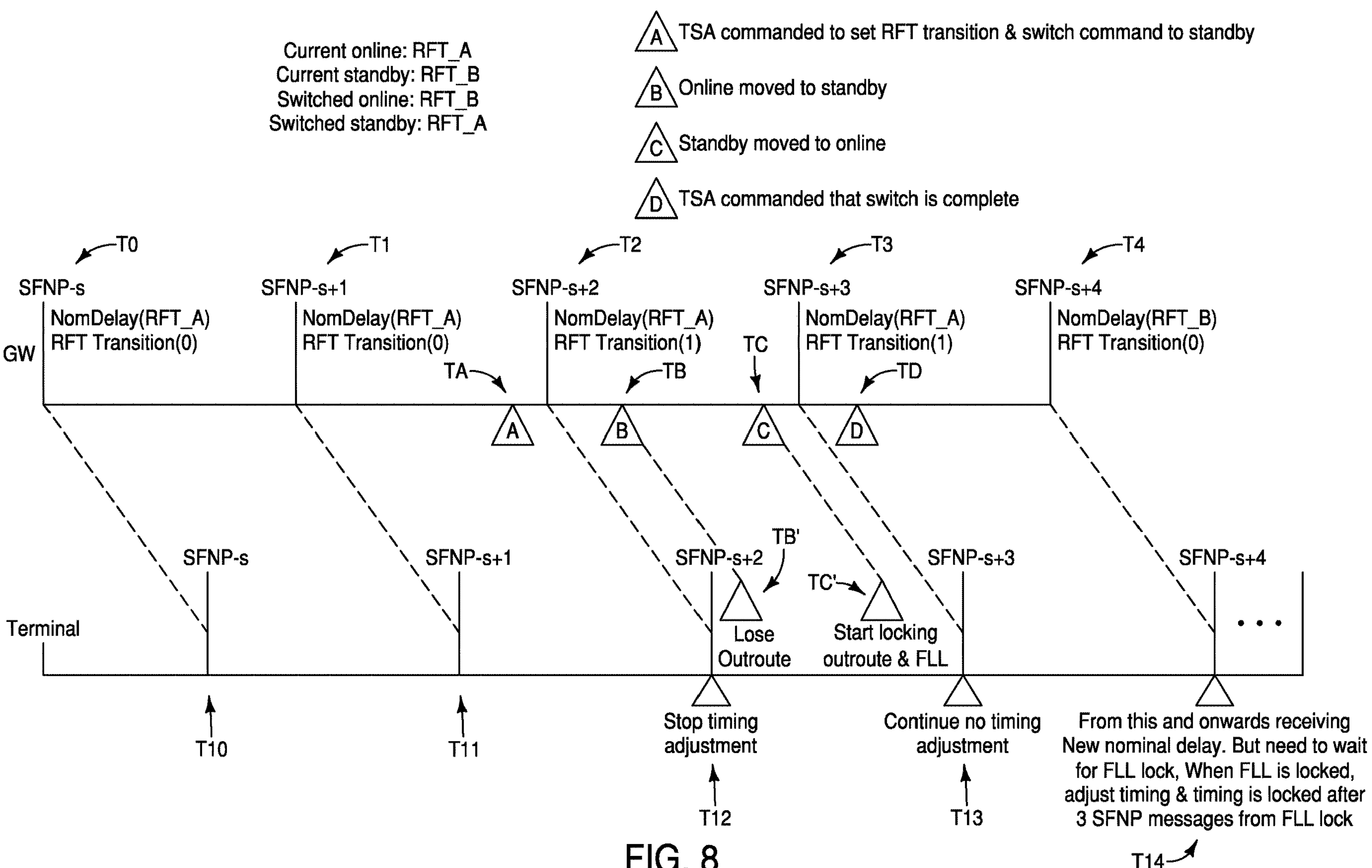
FIG. 8 is a timing chart showing the transmission process of Superframe Numbering Packet (SFNP) messages by the satellite gateway and the connection process of the communication terminal.
Figure 9:
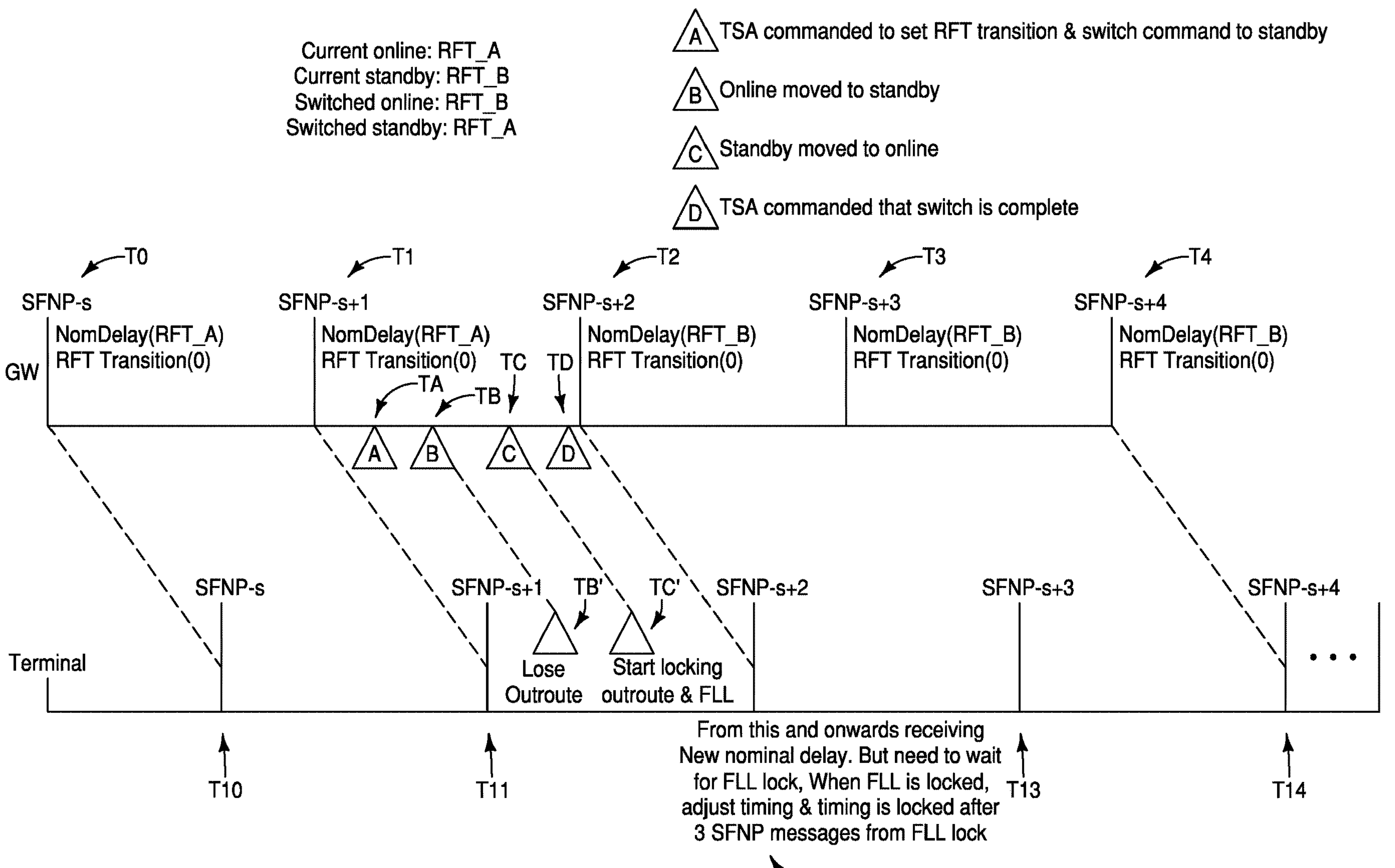
FIG. 9 is another timing chart showing the transmission process of the SFNP messages by the satellite gateway and the connection process of the communication terminal.

FIGS. 8 and 9 illustrate timing charts showing the timing relationship between the transmission process of the SFNP messages by the gateway 12 (see FIG. 6) and the connection process of the communication terminals 24 (see FIG. 5) during the switching process. In the illustrated embodiment, the switching process from the first RFT 16A to the second RFT 16B (i.e., the switching process from the first satellite communication path CA to the second satellite communication path CB) will be described in detail. Thus, in the illustrated embodiment, the first RFT 16A is a currently active or online RFT, and the second RFT 16B is a currently backup or standby RFT. With the switching of the RF site diversity, the first RFT 16A is switched to a backup or standby RFT, and the second RFT 16B is switched to an active or standby RFT. The switching process from the second RFT 16B to the first RFT 16A can also be executed in the same manner, and thus will not be described for the sake of brevity.

Figure 6:
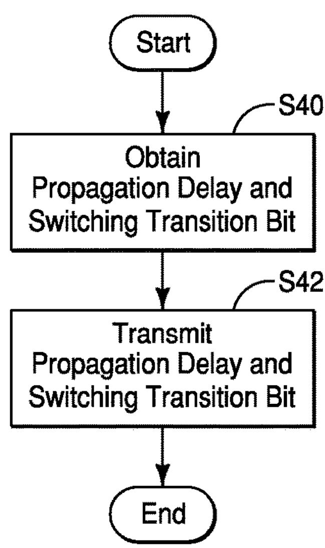
FIG. 6 is a flowchart showing a transmission process of the SFNP messages by the satellite gateway.

As mentioned above, the SFNP message is periodically sent from the gateway 12. FIG. 6 illustrates a flowchart showing this transmission process of the SFNP messages by the gateway 12. In particular, every time the controller 20 of the gateway 12 estimate or set the network parameters (i.e., the nominal propagation delay and the switching transition bit) through the parameter setting process illustrated in FIG. 7, the network parameters are stored in the memory 22 of the gateway 12. Then, as illustrated in FIG. 6, the controller 20 of the gateway 12 obtains the network parameter from the memory 22 (step S40), and periodically transmits the network parameter to the communication terminals 24 (step S42) at the constant interval of 360 milliseconds, for example.

Figure 7:
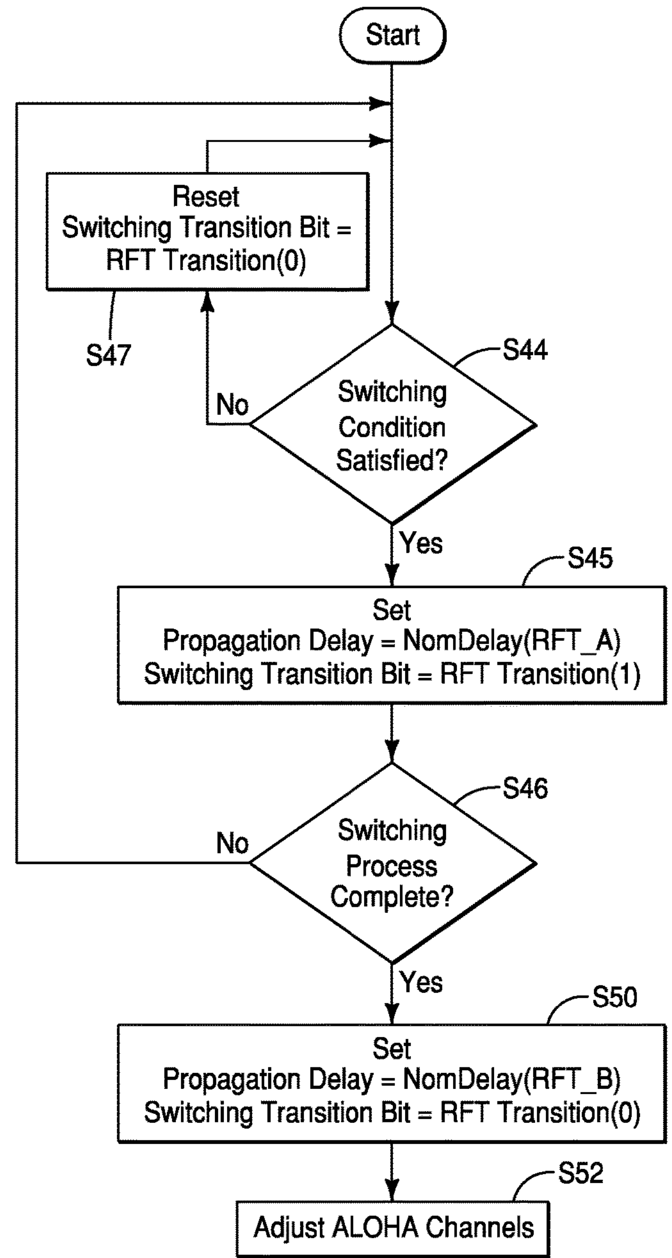
FIG. 7 is a flowchart showing a parameter setting process by the satellite gateway.

Referring now to FIG. 7, the parameter setting process by the switching algorithm executed by the controller 20 will be described in detail. This parameter setting process illustrated in FIG. 7 is also periodically executed, but can be independently executed from the transmission process illustrated in FIG. 6. Specifically, the controller 20 first determines whether a predetermined switching condition is satisfied (step S44). This predetermined switching condition can be the same as the predetermined switching condition utilized in step S22 in FIG. 4B. If the controller 20 determines that the predetermined switching condition is satisfied (Yes in step S44), then the controller 20 sets the switching transition bit to indicate that the switching process of the satellite communication path is occurring (step S45). Also, the controller 20 sets the propagation delay to indicate the propagation delay of the first RFT 16A (step S45). Furthermore, the controller 20 determines whether the switching process is complete (step S46). If the controller 20 determines that the switching process from the first RFT 16A to the second RFT 16B is complete (Yes in step S46), then the controller 20 sets the switching transition bit to indicate that the switching process of the satellite communication path is not occurring (step S50). Also, the controller 20 sets the propagation delay to indicate the propagation delay of the second RFT 16B (step S50). Moreover, the controller 20 can optionally adjust ALOHA channels to accelerate the access of the communication terminals 24 to the satellite communication network (step S52). This adjustment of ALOHA channels will be described later.

On the other hand, if the controller 20 determines that the predetermined switching condition is not satisfied (No in step S44), then the controller 20 sets the switching transition bit to indicate that the switching process of the satellite communication path is not occurring (step S47), and the process returns to step S44. Also, if the controller 20 determines that the switching process from the first RFT 16A to the second RFT 16B is not complete (No in step S46), then the process returns to step S44.

Referring now to FIGS. 8 and 9, the timing relationship between the transmission process of the SFNP messages by the gateway 12 (see FIG. 6) and the connection process of the communication terminals 24 (see FIG. 5) during the switching process will be described in detail. FIG. 8 illustrates a timing chart of a case where two SFNP messages are sent with the switching transition bit ON, and the communication terminals 24 receive the two SFNP messages with the switching transition bit ON. In particular, the first SFNP message is received while the outroute is still connected to the old RFT (i.e., the first RFT 16A), and the second SFNP message is received after the outroute is connected to the new RFT (i.e., the second RFT 16B). On the other hand, FIG. 9 illustrates a timing chart of a case where no SFNP message is sent with the switching transition bit ON because the switching process is initiated and completed between the transmissions of two successive SFNP messages.

As illustrated in FIG. 8, the SFNP messages are periodically transmitted from the gateway 12 to the communication terminals 24. Specifically, SFNP messages SFNP-s to SFNP-s+4 are illustrated that are periodically transmitted at the timings T0 to T4, respectively. In response, the communication terminals 24 receive the SFNP messages SFNP-s to SFNP-s+4 at the timings T10 to T14, respectively. The SFNP messages SFNP-s to SFNP-s+4 each include a nominal propagation delay of the satellite communication path and a switching transition bit as a network parameter of the satellite communication path.

In FIG. 8, "NomDelay(RFT_A)" represents the nominal propagation delay of the first satellite communication paths CA through the first RFT 16A, while "NomDelay(RFT_B)" represents the nominal propagation delay of the second satellite communication paths CB through the second RFT 16B. Also, "RFT Transition(0)" represents that the switching transition bit is OFF (or 0) and that the switching process is not in transition, while "RFT Transition(1)" represents that the switching transition bit is ON (or 1) and that the switching process is in transition.

As illustrated in FIG. 8, before the switching process from the first RFT 16A to the second RFT 16B is started, the TSA 42B transmits the SFNP messages SFNP-s and SFNP-s+1 with "NomDelay(RFT_A)" and "RFT Transition(0)" at the timings T0 and T1, respectively. Specifically, the switching algorithm executed by the controller 20 determines whether the predetermined switching condition is satisfied (step S44 in FIG. 7). Since the switching process has not started at the timings T0 and T1 (No in step S44 in FIG. 7), the process returns to step S44 after resetting the switching transition bit to "RFT Transition(0)" (step S47 in FIG. 7).

As illustrated in FIG. 8, when the controller 20 determines that the predetermined switching condition is satisfied (Yes in step S44 in FIG. 7), then the TSA 42B is commanded to set a RFT transition and switch command to standby at the timing TA that is between the timings T1 and T2. As a result, the TSA 42B sets the switching transition bit to ON (step S45 in FIG. 7) and transmits the next SFNP message SFNP-s+2 with "RFT Transition(1)" at the timing T2. Since the switching process from the first RFT 16A to the second RFT 16B is not completed at the timing T2, the TSA 42B also transmits the SFNP message SFNP-s+2 with the propagation delay "NomDelay(RFT_A)."

In response, the communication terminals 24 receive the SFNP message SFNP-s+2 at the timing T12. When the communication terminals 24 sees that the switching transition bit of the SFNP message SFNP-s+2 is set to ON (RFT Transition(1)) (Yes in step S62 in FIG. 5), then the communication terminals 24 stop or freeze the timing synchronization (step S63 in FIG. 5).

On the other hand, in response to determining that the predetermined switching condition is satisfied, the switching algorithm executed by the controller 20 controls the RFT switcher 23 to physically execute the switching of the RF site diversity. Specifically, the controller 20 controls the RFT switcher 23 using the switching determination process as illustrated in FIGS. 4A and 4B. In the illustrated embodiment, the first RFT 16A is moved from online to standby or backup at the timing TB, and then the second RFT 16B is moved from standby to online or active at the timing TC. In the illustrated embodiment, the timings TB and TC are between the timings T2 and T3. In response, the communication terminals 24 lose lock with the outroute signal via the first communication path CA (with the first RFT 16A) at the timing TB' corresponding to the timing TB. Furthermore, the communication terminals 24 start locking with the outroute signal via the second communication path CB (with the second RFT 16B) at the timing TC' corresponding to the timing TC, and start the FLL procedure to lock to the outroute signal.

The TSA 42B also transmits the next SFNP message SFNP-s+3 at timing T3. Since the TSA 42B has not been informed that the switching process is completed (No in step S46 in FIG. 7), the TSA 42B transmits the SFNP message SFNP-s+3 with "NomDelay(RFT_A)" and "RFT Transition (1)" at timing T3. In response, the communication terminals 24 receive the SFNP message SFNP-s+3 at the timing T13. When the communication terminals 24 sees that the switching transition bit of the SFNP message SFNP-s+3 is set to ON (RFT Transition(1)) (Yes in step S62 in FIG. 5), then the communication terminals 24 continue stopping the timing synchronization (step S63 in FIG. 5).

In the illustrated embodiment, two SFNP messages SFNP-s+2 and SFNP-s+3 are sent with the switching transition bit ON at the timings T2 and T3, respectively. Furthermore, the communication terminals 24 receive the two SFNP messages SFNP-s+2 and SFNP-s+3 with the switching transition bit ON at the timings T12 and T13. As illustrated in FIG. 8, the SFNP message SFNP-s+2 is received when the communication terminals 24 are still connected to the old outroute (i.e., the first satellite communication path CA), while the SFNP message SFNP-s+3 is received when the communication terminals 24 are changed to the new outroute (i.e., the second satellite communication path CA).

Once the switching process by the RFT switcher 23 is completed, the RFTMon application 46 is informed by the RFT switcher 23 that the switching process is completed. Then, the TSA 42B is commanded by the RFTMon application 46 at the timing TD that the switching process is completed (Yes in step S46 in FIG. 7) such that the TSA 42B can change the switching transition bit to OFF (RFT Transition(0)). In the illustrated embodiment, the timing TD is between the timings T3 and T4.

As a result, the TSA 42B sets the switching transition bit to OFF and transmits the next SFNP message SFNP-s+4 with "RFT Transition(0)" at the timing T4 (step S50 in FIG. 7). Also, since the switching process from the first RFT 16A to the second RFT 16B is completed at the timing TD, the TSA 42B also sets and transmits the propagation delay "NomDelay(RFT_B)" in the SFNP message SFNP-s+4 (step S50 in FIG. 7).

In response, the communication terminals 24 receive the SFNP message SFNP-s+4 at the timing T14. When the communication terminals 24 sees that the switching transition bit of the SFNP message SFNP-s+4 is set to OFF (RFT Transition(0)) (No in step S62 in FIG. 5), then the communication terminals 24 start the timing synchronization (step S64 in FIG. 5). In particular, after the timing T14, the communication terminals 24 receive the new nominal propagation delay of the second satellite communication path CB from the gateway 12. The communication terminals 24 first need to wait for FLL lock. When the FLL is locked, then the communication terminals 24 conduct the timing synchronization (e.g., the closed loop timing adjustment), and the timing is locked after receiving three SFNP messages from the timing of the FLL lock.

FIG. 9 illustrates a case where the above-mentioned timings TA to TD occur between two successive SFNP messages SFNP-s+1 and SFNP-s+2. In particular, the switching algorithm executed by the controller 20 determines that the predetermined switching condition is satisfied (Yes in step S44 in FIG. 7) and the TSA 42B is commanded to set a RFT transition and switch command to standby at the timing TA after transmitting the SFNP message SFNP-s+1 with "NomDelay(RFT_A)" and "RFT Transition(0)" at the timing T1. In response to the controller 20 determining that the predetermined switching condition is satisfied (Yes in step S44 in FIG. 7), the TSA 42B sets the switching transition bit to ON (step S45 in FIG. 7). On the other hand, the first RFT 16A is moved from online to standby or backup at the timing TB, and then the second RFT 16B is moved from standby to online or active at the timing TC. Then, the TSA 42B is commanded at the timing TD that the switching process is completed (Yes in step S46 in FIG. 7). As a result, the TSA 42B resets the switching transition bit to OFF at the timing TD (step S50 in FIG. 7) before transmitting the next SFNP message SFNP-s+2 at the timing T2. Thus, the next SFNP message SFNP-s+2 is transmitted with "NomDelay (RFT_B)" and "RFT Transition(0)" at the timing T2.

In response, the communication terminals 24 receive the SFNP message SFNP-s+2 at the timing T12. When the communication terminals 24 sees that the switching transition bit of the SFNP message SFNP-s+2 is set to OFF (RFT Transition(0)) (No in step S62 in FIG. 5), then the communication terminals 24 start the timing synchronization (step S64 in FIG. 5). In particular, after the timing T14, the communication terminals 24 receive the new nominal propagation delay of the second satellite communication path CB from the gateway 12. The communication terminals 24 first need to wait for FLL lock. When the FLL is locked, then the communication terminals 24 conduct the timing synchronization (e.g., the closed loop timing adjustment), and the timing is locked after receiving three SFNP messages from the timing of the FLL lock.

As mentioned above, in step S52 in FIG. 7, the controller 20 can optionally adjust ALOHA channels to accelerate the access of the communication terminals 24 to the satellite communication network. Specifically, in the illustrated embodiment, when the switching of the RF site diversity is successful, then the controller 20 executing the switch algorithm communicates with the NMS 44 (or inroute resource manager) and the SGW 42A (or bandwidth allocator) inside the gateway 12 to request for opening or configuring more ALOHA channels dynamically such that the entire population of the communication terminals 24 can reenter the satellite communication network quickly. When a configurable percentage of the communication terminals 24 have come back, then the number of ALOHA channels are decreased to the normal or typical configured value. With this configuration, the access of the communication terminals 24 to the satellite communication network can be successfully accelerated after a small outage related to the switching of the RF site diversity.

Furthermore, instead of using contention-based ALOHA channels access to reenter the satellite communication network after the switching of the RF site diversity, the communication terminals 24 can use the allocated stream bandwidth to come back in step S52 in FIG. 7. In this case, the controller 20 that decides the switching of the RF site diversity conveys to the inroute resource manager that the RF site diversity is initiated such that the inroute resource manager does not deactivate the currently active communication terminals 24 from the stream bandwidth allocation even though the inroute resource manager does not see the bursts from the communication terminals 24. The Inroute resource manager is also informed about the result of the switching of the RF site diversity (success or failure), as it occurs. If it is a successful switch, then the inroute resource manager continues allocating stream bandwidth to the currently active communication terminals 24. On the other hand, if it is a failed switch, then the inroute resource manager deallocates the communication terminals 24 from the stream bandwidth. In other words, the controller 20 holds the bandwidth allocation for communication with the communication terminals 24 that has been allocated before step S44 in FIG. 7 during the switching process of the satellite communication path (i.e., during processing steps S44, S45, S46 and S50). This also accelerates the access of the communication terminals 24 to the satellite communication network.

In the illustrated embodiment, the controller 20 determines whether the predetermined switching condition is satisfied (step S44 in FIG. 7) and whether the switching process is complete (step S46 in FIG. 7). The controller 20 periodically transmits the network parameter to the communication terminals 24 (step S42 in FIG. 6). The controller sets the switching transition bit (e.g., the transition indicator) of the network parameter to indicate that the switching process of the satellite communication path is occurring ("RFT Transition(1)") (step S45 in FIG. 7) after determining that the predetermined switching condition is satisfied (Yes in step S44 in FIG. 7) and before determining that the switching process of the satellite communication path is complete (Yes in step S46 in FIG. 7).

In the illustrated embodiment, the controller 20 sets the propagation delay of the network parameter to indicate the nominal propagation delay "NomDelay(RFT_A)" (e.g., first propagation delay) along the first satellite communication path CA (step S45 in FIG. 7) after determining that the predetermined switching condition is satisfied (Yes in step S44 in FIG. 7) and before determining that the switching process of the satellite communication path is complete (Yes in step S46 in FIG. 7).

In the illustrated embodiment, the controller 20 sets the propagation delay of the network parameter to indicate the nominal propagation delay "NomDelay(RFT_B)" (e.g., the second propagation delay) along the second satellite communication path CB (step S50 in FIG. 7) after determining that the switching process of the satellite communication path is complete (Yes in step S46 in FIG. 7).

In the illustrated embodiment, the communication terminals 24 adjust the TDMA transmission timing (e.g., the propagation parameter) for communication with the gateway 12 based on the propagation delay (e.g., the network parameter) transmitted from the gateway 12.

In the illustrated embodiment, the communication terminals 24 adjust the TDMA transmission timing (e.g., the propagation timing of the propagation parameter) based on the propagation delay of the network parameter transmitted from the gateway 12 while the switching transition bit (e.g., the transition indicator of the network parameter) transmitted from the gateway 12 indicates that the switching process of the satellite communication path is not occurring (No in step S62 in FIG. 5). The communication terminals 24 does not adjust the TDMA transmission timing while the switching transition bit transmitted from the gateway 12 indicates that the switching process of the satellite communication path is occurring (Yes in step S62 in FIG. 5).

In the illustrated embodiment, the network parameter is transmitted to the communication terminals 24 in the Superframe Numbering Packet.

In the illustrated embodiment, the communication terminals execute the frequency locked loop procedure to be locked to a clock of the gateway 12 (step S64 in FIG. 5).

In the illustrated embodiment, the controller 20 temporarily increases the number of ALOHA channels for communication with the communication terminals 24 in response to determining that the switching process of the satellite communication path is complete (Yes in step S46 in FIG. 7).

In the illustrated embodiment, the controller 20 holds the bandwidth allocation for communication with the communication terminals 24 during the switching process of the satellite communication path (during steps S44, S45, S46, and S50).

In the illustrated embodiment, the satellite communication system 10 includes the first RFT 16A (e.g., the first radio frequency transceiver) and the second RFT 16B (e.g., the second radio frequency transceiver). The first RFT 16A is located between the gateway 12 and the satellite 14 on the first satellite communication path CA. The second RFT 16B is located between the gateway 12 and the satellite 14 on the second satellite communication path CB. The second RFT 16B is located away from the first RFT 16A.

In the illustrated embodiment, a satellite communication method includes switching the satellite communication path between the gateway 12 (e.g., the ground station) and the communication terminals 24 via the satellite 14 from the first satellite communication path CA to the second satellite communication path CB different from the first satellite communication path CA, determining whether the predetermined switching condition is satisfied (step S44 in FIG. 7) and whether the switching process is complete (step S46 in FIG. 7), periodically transmitting the network parameter to the communication terminals 24 (step S42 in FIG. 6), and setting the switching transition bit (e.g., the transition indicator) of the network parameter to indicate that the switching process of the satellite communication path is occurring ("RFT Transition(1)") (step S45 in FIG. 7) after determining that the predetermined switching condition is satisfied (Yes in step S44 in FIG. 7) and before determining that the switching process of the satellite communication path is complete (Yes in step S46 in FIG. 7).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, “including”, “having” and their derivatives. Also, the terms “part,” “section,” “portion,” “member” or “element” when used in the singular can have the dual meaning of a single part or a plurality of parts. Also, the term “detect” as used herein to describe an operation or function carried out by a component, a section, a device or the like includes a component, a section, a device or the like that does not require physical detection, but rather includes determining, measuring, modeling, predicting or computing or the like to carry out the operation or function. The term “configured” as used herein to describe a component, section or part of a device includes hardware and/or software that is constructed and/or programmed to carry out the desired function. The terms of degree such as “substantially”, “about” and “approximately” as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A satellite communication system comprising:

a communication terminal;

a ground station configured to communicate with the communication terminal through a satellite communication path between the ground station and the communication terminal via a satellite, the ground station including a diversity switch configured to switch the satellite communication path from a first satellite communication path to a second satellite communication path different from the first satellite communication path, and an electronic controller configured to determine whether a predetermined switching condition is satisfied based on signal attenuations of the first and second satellite communication paths, the electronic controller being further configured to control the diversity switch to switch the satellite communication path upon elapsing a first predetermined time period after determining that the predetermined switching condition is satisfied;

a first radio frequency transceiver located between the ground station and the satellite on the first satellite communication path; and a second radio frequency transceiver located between the ground station and the satellite on the second satellite communication path, the second radio frequency transceiver being located away from the first radio frequency transceiver, the electronic controller being further configured to obtain, as the signal attenuations of the first and second satellite communication paths, signal fade of downlink beacon that has been broadcasted by the satellite and received by the first and second radio frequency transceivers on the first and second satellite communication paths, respectively.

2. The satellite communication system according to claim 1, wherein the electronic controller is further configured not to control the diversity switch to switch the satellite communication path when the electronic controller determines that the predetermined switching condition is not satisfied for more than a second predetermined time period before elapsing the first predetermined time period.

3. The satellite communication system according to claim 1, wherein the electronic controller is further configured to control the diversity switch to switch the satellite communication path upon elapsing the first predetermined time period after firstly determining that the predetermined switching condition is satisfied when the electronic controller subsequently determines that the predetermined switching condition is satisfied within a second predetermined time period after determining that the predetermined switching condition is not satisfied.

4. The satellite communication system according to claim 1, wherein the electronic controller is further configured to determine that the predetermined switching condition is satisfied upon determining that the signal fade of the downlink beacon on the first satellite communication path is larger than a first fade threshold and that the signal fade of the downlink beacon on the second satellite communication path is smaller than a second fade threshold.

5. A satellite communication system comprising:

a communication terminal; and a ground station configured to communicate with the communication terminal through a satellite communication path between the ground station and the communication terminal via a satellite, the ground station including a diversity switch configured to switch the satellite communication path from a first satellite communication path to a second satellite communication path different from the first satellite communication path, and an electronic controller configured to determine whether a predetermined switching condition is satisfied and whether a switching process of the satellite communication path is complete, the electronic controller being further configured to periodically transmit a network parameter to the communication terminal, the electronic controller being further configured to set a transition indicator of the network parameter to indicate that the switching process of the satellite communication path is occurring after determining that the predetermined switching condition is satisfied and before determining that the switching process of the satellite communication path is complete.

6. The satellite communication system according to claim 5, wherein the electronic controller is further configured to set a propagation delay of the network parameter to indicate a first propagation delay along the first satellite communication path after determining that the predetermined switching condition is satisfied and before determining that the switching process of the satellite communication path is complete.

7. The satellite communication system according to claim 6, wherein the electronic controller is further configured to set the propagation delay of the network parameter to indicate a second propagation delay along the second satellite communication path after determining that the switching process of the satellite communication path is complete.

8. The satellite communication system according to claim 5, wherein the communication terminal is configured to adjust a propagation parameter for communication with the ground station based on the network parameter transmitted from the ground station.

9. The satellite communication system according to claim 8, wherein the communication terminal is configured to adjust a propagation timing of the propagation parameter based on a propagation delay of the network parameter transmitted from the ground station while the transition indicator of the network parameter transmitted from the ground station indicates that the switching process of the satellite communication path is not occurring, and the communication terminal is configured not to adjust the propagation timing of the propagation parameter while the transition indicator of the network parameter transmitted from the ground station indicates that the switching process of the satellite communication path is occurring.

10. The satellite communication system according to claim 5, wherein the network parameter is transmitted to the communication terminal in a Superframe Numbering Packet.

11. The satellite communication system according to claim 5, wherein the communication terminal is configured to execute a frequency locked loop procedure to be locked to a clock of the ground station.

12. The satellite communication system according to claim 5, wherein the electronic controller is further configured to temporarily increase a number of ALOHA channels for communication with the communication terminal in response to determining that the switching process of the satellite communication path is complete.

13. The satellite communication system according to claim 5, wherein the electronic controller is further configured to hold a bandwidth allocation for communication with the communication terminal during the switching process of the satellite communication path.

14. The satellite communication system according to claim 5, further comprising a first radio frequency transceiver located between the ground station and the satellite on the first satellite communication path, and a second radio frequency transceiver located between the ground station and the satellite on the second satellite communication path, the second radio frequency transceiver being located away from the first radio frequency transceiver.

15. A satellite communication method comprising:

switching, by a diversity switch, a satellite communication path between a ground station and a communication terminal via a satellite from a first satellite communication path to a second satellite communication path different from the first satellite communication path:

determining whether a predetermined switching condition is satisfied based on signal attenuations of the first and second satellite communication paths;

controlling the diversity switch to switch the satellite communication path upon elapsing a first predetermined time period after determining that the predetermined switching condition is satisfied; and obtaining, as the signal attenuations of the first and second satellite communication paths, signal fade of downlink beacon that has been broadcasted by the satellite and received by first and second radio frequency transceivers on the first and second satellite communication paths, respectively, the first radio frequency transceiver being located between the ground station and the satellite on the first satellite communication path, the second radio frequency transceiver being located between the ground station and the satellite on the second satellite communication path, the second radio frequency transceiver being located away from the first radio frequency transceiver.

16. A satellite communication method comprising:

switching a satellite communication path between a ground station and a communication terminal via a satellite from a first satellite communication path to a second satellite communication path different from the first satellite communication path;

determining whether a predetermined switching condition is satisfied and whether a switching process of the satellite communication path is complete;

periodically transmitting a network parameter to the communication terminal; and setting a transition indicator of the network parameter to indicate that the switching process of the satellite communication path is occurring after determining that the predetermined switching condition is satisfied and before determining that the switching process of the satellite communication path is complete.

* * * * *